United States Patent

Reinartz et al.

Patent Number: 5,192,120
Date of Patent: Mar. 9, 1993

[54] BRAKE PRESSURE CONTROL SYSTEM WITH AN ELECTRICAL MOTOR OPERATING A PUMP AND CONTROL VALVE

[75] Inventors: Hans-Dieter Reinartz, Frankfurt am Main; Peter Volz, Darmstadt; Erhard Beck, Weilburg; Andre F. L. Goossens, Rumst, all of Fed. Rep. of Germany

[73] Assignee: Alfred Teves GmbH, Frankfurt am Main, Fed. Rep. of Germany

[21] Appl. No.: 809,534

[22] PCT Filed: Mar. 14, 1991

[86] PCT No.: PCT/EP91/00485
§ 371 Date: Feb. 19, 1992
§ 102(e) Date: Feb. 19, 1992

[87] PCT Pub. No.: WO91/18775
PCT Pub. Date: Dec. 12, 1991

[30] Foreign Application Priority Data

May 25, 1990 [DE] Fed. Rep. of Germany ....... 4016745

[51] Int. Cl.$^5$ .............................. B60T 8/34
[52] U.S. Cl. ................................ 303/113.2; 303/10; 303/116.4
[58] Field of Search .............. 303/113 R, 113 TR, 10, 303/11, 116 R, 116 SP, 116 PC, 117

[56] References Cited

U.S. PATENT DOCUMENTS

| | | | |
|---|---|---|---|
| 3,645,584 | 2/1972 | Leiber et al. | 303/116 PC |
| 3,679,270 | 7/1972 | Jania | 303/10 X |
| 4,141,595 | 2/1979 | Leiber | 303/10 |
| 4,571,010 | 2/1986 | Dittner et al. | 303/113 TP X |
| 4,826,255 | 5/1989 | Volz | 303/10 |

FOREIGN PATENT DOCUMENTS

| | | |
|---|---|---|
| 3731603 | 5/1988 | Fed. Rep. of Germany . |
| 3717238 | 12/1988 | Fed. Rep. of Germany . |
| 3813174 | 11/1989 | Fed. Rep. of Germany . |

Primary Examiner—Matthew C. Graham
Assistant Examiner—Peter M. Poon
Attorney, Agent, or Firm—Robert P. Seitter; J. Gordon Lewis

[57] ABSTRACT

A brake pressure control system with an anti-locking control is presented which is operated with hydraulic fluid including a master cylinder and a plurality of valves for the modulation of the hydraulic pressure in the wheel cylinders of the wheel brakes during a brake pressure control mode, and at least one motor-driven pump (48). An axially movable rotor (66) of the motor (14) is furnished with a thrust member (49) which shifts upon motor start up to actuate a control valve. The fluid connection between the master cylinder (37) and the wheel cylinder (43) is thereby interrupted almost instantaneously. Also, by actuating the valve, fluid flows through a flow limiting valve (59), delivered by the pump (48), into the wheel cylinder (43). A rapid pressure reduction is achieved in the wheel cylinder.

13 Claims, 4 Drawing Sheets

BRAKE PRESSURE CONTROL SYSTEM WITH AN ELECTRICAL MOTOR OPERATING A PUMP AND CONTROL VALVE

BACKGROUND OF THE INVENTION

The invention is related to brake pressure control systems for automotive vehicles having an anti-locking control system (ABS) and/or with a traction slip control system (TSS), which is operated with fluid, in particular with hydraulic fluid pressure Such systems typically include a master cylinder, one or more wheel cylinders for wheel brakes, and a pressure modulator comprising a plurality of valves for the modulation of the hydraulic pressure in the wheel cylinders of the wheel brakes during a brake pressure control mode. At least one motor-driven pump is usually employed for generat[ion]ing fluid hydraulic pressure, and an electronic controller for controlling the valves and the pump.

An example of such a brake system is described in German patent application published without examination, No. 3,731,603.

As noted, brake systems of this kind equipped with an anti-locking control system and/or with a traction slip control system are furnished with one or two auxiliary pumps which deliver pressurized fluid into the pressure modulator during the anti-locking control mode. The pressure modulator comprises a plurality of hydraulic valves. In particular, sets of inlet and outlet valves are provided in the pressure modulator which are associated with respective wheel cylinders.

The driver stage of the electronic controller operates the inlet and outlet valves in accordance with the control algorithm incorporated in the controller.

A pressure reduction phase is generated in the wheel cylinder when the outlet valve is open and the inlet valve is closed. When the inlet valve is closed and the outlet valve is closed a pressure stabilization phase comes about. When the inlet valve is open and the outlet valve is closed a pressure rebuilding-up phase ensues.

Furthermore, hydraulic connections have been described in which the inlet valve has a restrictive effect. See German patent application P 3,919,842.1.

In that patent application, a hydraulic brake unit for a vehicle is described which is equipped with an anti-locking control system, with a master cylinder, a fluid pressure accumulator, at least one wheel brake which is connected to the master brake cylinder through a brake line and is in connection with the fluid pressure accumulator through a return line. An electromagnetically actuated outlet valve is inserted in the return line which shuts off the return line in its normal position and opens the retain line in its switching position. A restriction valve is installed in the brake line and is furnished with two switching positions, an unrestricted connection existing between the wheel brake and the master brake cylinder in the first switching position and a restricted connection existing between the wheel brake and the master brake cylinder in the second switching position. A pump aspirates fluid from the accumulator and delivers it through a pressure line into the master cylinder. A sensor monitors the angular velocity of the wheel to be braked and an electronic evaluation unit evaluates the sensor signal and generates switching signals for the pump drive and for the outlet valve.

It is proposed in the forementioned German patent application that the restriction valve is connected by means of a control line to the outlet of the pump so that the pressure at the outlet of the pump shifts the restriction valve from the first into the second switching position.

In the embodiments as per FIGS. 4 to 7 of the German patent application published without examination, No. 3,731,603 an electric driving motor for a pump for hydraulic brake systems are described whose rotor is axially movable.

In practice it has proved to be desirable to be able to switch more rapidly than has been possible as yet the inlet valves of the pressure modulators of the state of the art, for example, the NO valves, open when deenergized of the subject matter of the above-mentioned patent application published without examination, or the inlet valves with restricting function of the subject matter of the above-mentioned earlier patent application.

The present invention has the following objects:

The inlet valves for the wheel cylinders of brake units such as those described above are to be switched more quickly than is possible according to the state of the art. The definition "inlet valve" has to be understood to have a general meaning. Indeed, the matter may be about inlet valves in accordance with the above-mentioned German patent application published without examination, in accordance with the above-mentioned earlier German patent application No. P 3,919,842.1 in which the inlet valves perform a restricting function, or about other types of inlet valves which serve to control the brake pressure in the wheel cylinder. It is, in particular, the object of the invention to achieve a very rapid pressure reduction in the wheel cylinder during the control mode. Furthermore, the pedal feeling is to be improved.

SUMMARY OF THE INVENTION

According to the invention, the objects set are attained in that at least a part of the rotor of the motor is an axially movable thrust member which actuates at least one valve element of the pressure modulator, that is to say, preferably an inlet valve.

It is, furthermore, proposed that at least two inlet valves are switchable through a force distributing mechanism, preferably through a beam balance, by the thrust member.

It is envisaged in a preferred embodiment that one control valve is actuated by the thrust member to block a first unrestricted connection between the master cylinder and the wheel cylinder; and, upon blocking of the first unrestricted connection, the fluid flow is conveyed over a second connection from the pump and from the master cylinder through a restriction to the wheel cylinder.

As a further development of this embodiment, the control valve is maintained in its blocking or switching position by the pump pressure.

The control valve may alternatively be maintained in its blocking or switching position by the master cylinder pressure.

As an alternative, it is proposed that the control valve is maintained in its blocking or switching position by the pump pressure and by the master cylinder pressure.

The above-mentioned restriction member may be an orifice.

In another embodiment, the restriction member may be a flow limiting valve.

Additionally it is proposed that as to the flow, an orifice is positioned between the restriction member, in particular between the flow limiting valve and the wheel cylinder.

In lieu of a thrust member which is moved by the rotor, in a further embodiment a magnet assembly with an axially movable thrust member is provided which switches the control valve.

For the design of the driving motor, it is proposed that the windings of the stator and/or of the rotor of the driving motor for the pumps boost the axial thrust of the rotor the motor is started.

In particular, it may be envisaged that the windings of the stator and/or of the rotor of the driving motor for the pumps are conical.

The following advantages will be achieved by the invention:

The desired rapid switching of the inlet valves with or without restricting function is attained in a surprisingly effective way and with relatively simple means.

Due to the use of the above-mentioned control valve, the connection between the master cylinder and the wheel cylinder is interrupted almost instantaneously. On account of the switching of the control valve, fluid will simultaneously flow restrictedly through a flow limiting valve from the pump into the wheel cylinder. Due to the use of relatively simple hydraulic means, a rapid pressure reduction in the wheel cylinder will be attained in a surprising manner. The pedal feeling is improved to a considerable extent.

Further details of the invention, of the objects set and of the advantages attained will be revealed by the detailed description of embodiments of the invention set out below.

DETAILED DESCRIPTION

Figure 1:
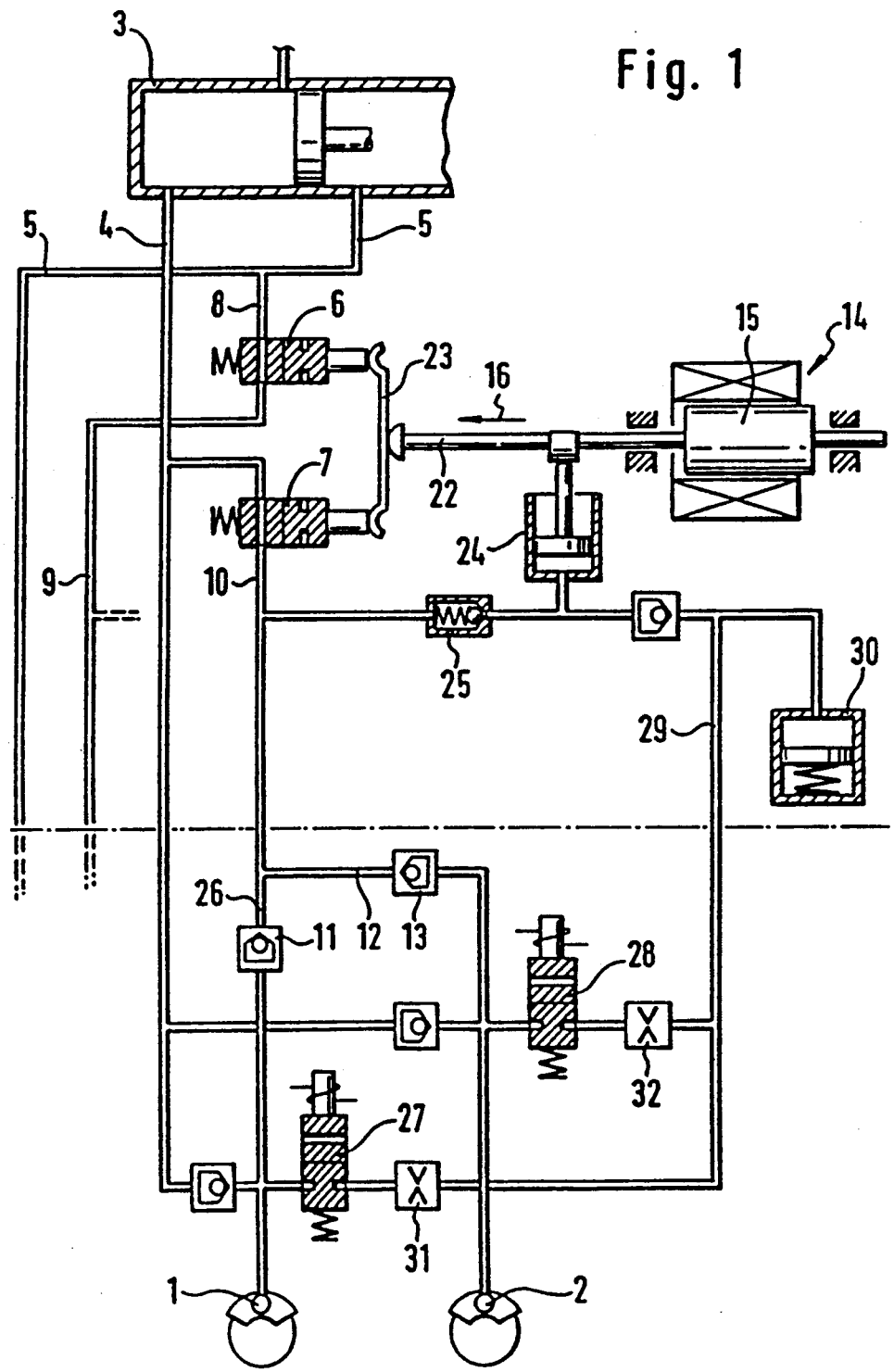
FIG. 1 is a diagrammatic representation of a brake control system according to the invention.

For reasons of simplification, the brake pressure control system is illustrated only for two brakes in FIG. 1, having wheel cylinders 1, 2. The master cylinder 3 is a tandem master cylinder.

In the event of actuation of the tandem master cylinder 3 in the normal braking mode, fluid will be conveyed through the lines 4, 5 into the brake unit. In the further description, reference is essentially made to the brake circuit which is in connection with the master cylinder through the line.

In the normal braking mode the inlet valves 6, 7 are open. This corresponds to their normal position. Brake fluid can, in this situation, be conveyed over the line 8 through the open inlet valve 6 into the line 9.

In the normal braking mode, fluid is delivered into the line 4 and flows through the inlet valve 7, the line 10 and is conveyed through the non-return valve 11 into the wheel cylinder 1. The second wheel cylinder 2 is supplied through the branch line 12 and the non-return valve 13.

In the anti-locking control mode (ABS mode), the electric motor 14 is started by electric control signals sent from the electronic controller.

At the moment of start, the rotor 15 of the motor 14 is given an axial thrust in the direction of the arrow 16. This effect is known in so-called brake motors which release a mechanical brake due to the axial thrust during the start.

Figure 4:
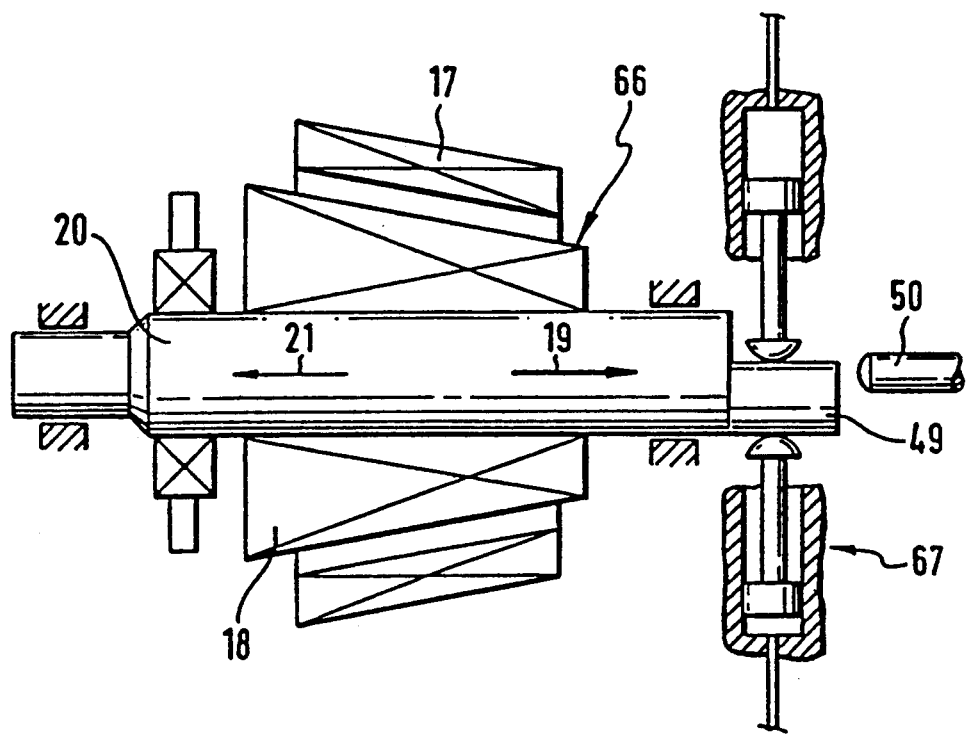
FIG. 4 is a longitudinal, partially sectional of an electric driving motor and pump incorporated in the brake control system shown in FIGS. 1–3.

In order to boost that axial thrust, the stator winding 17 and the rotor winding 18 may be configured conically as shown in FIG. 4.

In FIG. 4, the axial thrust is illustrated by the arrow 19. The shaft 20 of the rotor drives pump 67.

When the current supply for the motor 14 is interrupted, the rotor and shaft of the motor 14 will move back into its position of rest, according to the arrow According to the embodiment as per FIG. 1, a thrust member 22 is connected with the rotor is, on acts on a balance beam 23 in the direction of the arrow 16 at the moment of start of the motor.

As soon as the motor 14 is started on command of a control signal of the electronic controller, a force in the direction of the arrow 16 in FIG. 1 will be generated, and the two inlet valves 6, 7 will both be switched into their blocking position.

In the ABS control mode, fluid will then be pumped by the pump 24 drive by the motor 14 through the pressure limiting valve 25 into the lines 12 and 26. From there, fluid will be conveyed into the wheel cylinders 1, 2.

This supply of fluid, or the increase of the pressure in the wheel cylinders, becomes necessary within the framework of the ABS control mode when the control algorithm demands a rebuilding-up of the pressure.

In the pressure reduction phase, the outlet valves 27, 28 will be switched electromagnetically into the discharge position, whereas the inlet valves 6, 7 will remain closed.

As to the outlet valves 27, 28, these are so-called NC valves, closed when de-energized (NC valves). The NC valves receive their actuating signals from the driver stage of the electronic controller.

During the pressure reduction phase, fluid is conveyed from the wheel cylinder through the open NC valves into the line 29 and from there forth into an accumulator 30. The outlet valves 27, 28 are each succeeded by a restrictor 31, 32.

Figure 2:
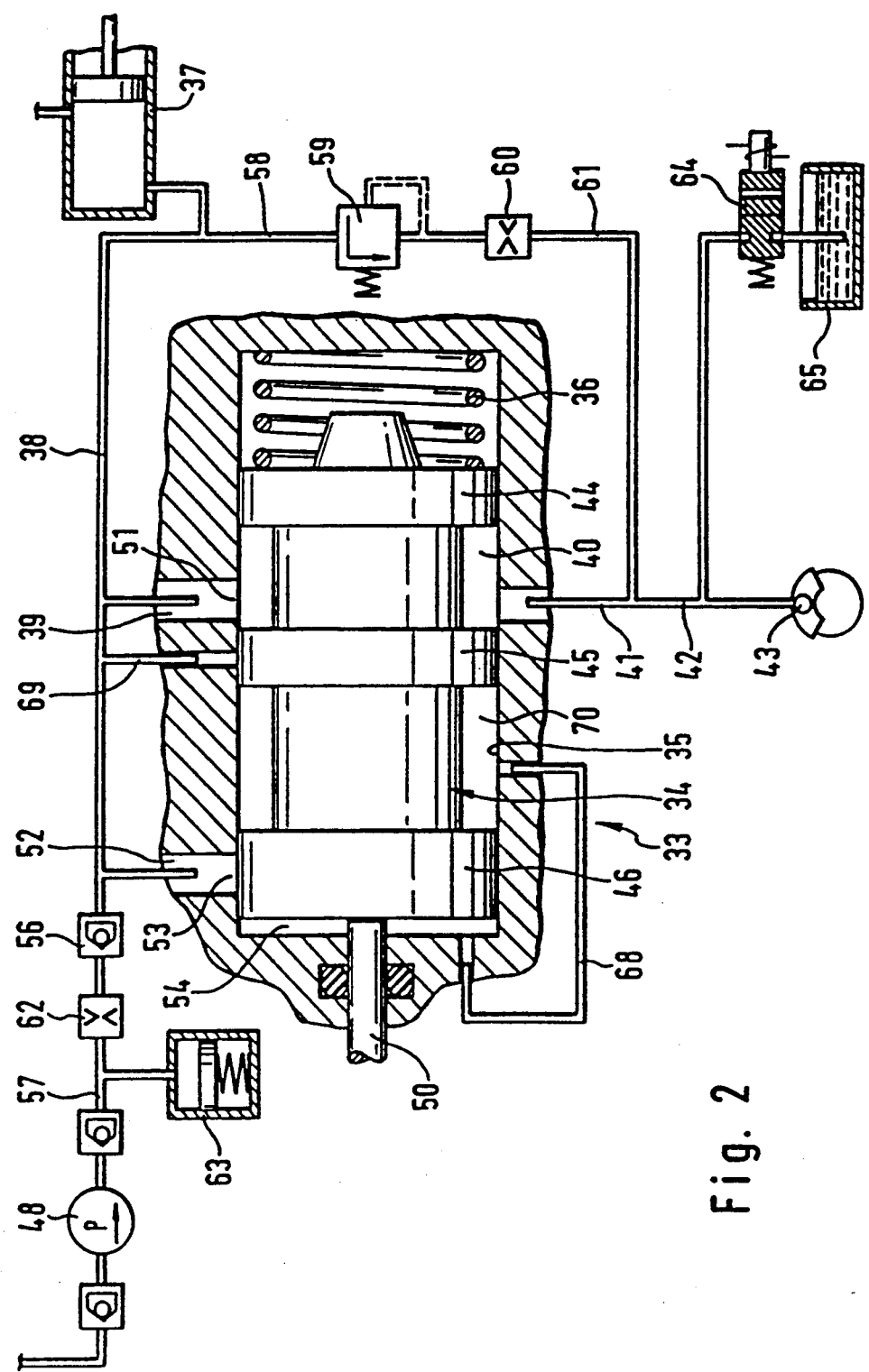
FIG. 2 is a diagrammatic representation of another embodiment of the brake control system according to the invention with a partially sectional view of a control valve incorporated therein.
Figure 3:
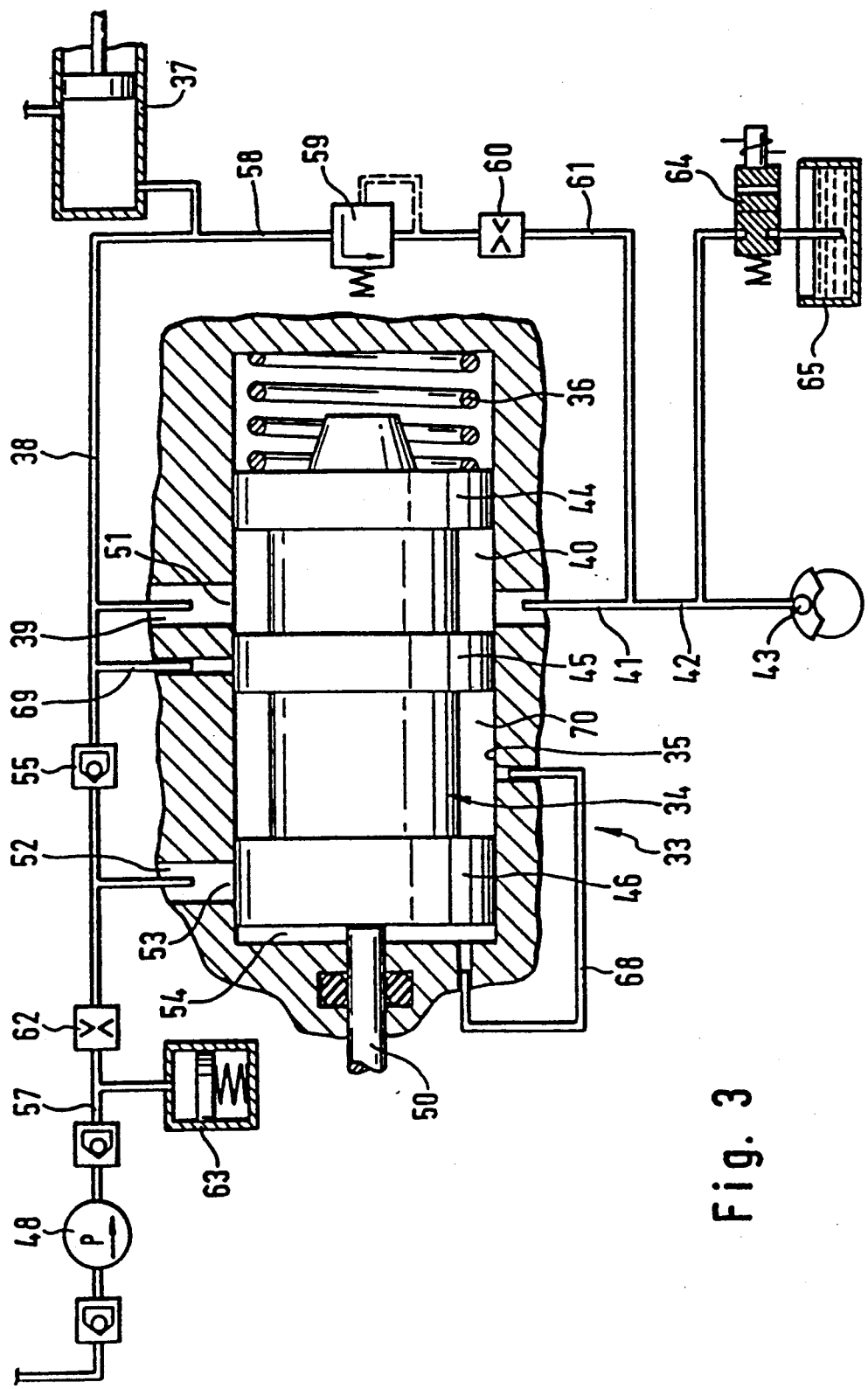
FIG. 3 is the same diagrammatic representation as FIG. 2 with a partially sectional view variant of the embodiment according to FIG. 2.

In the embodiments shown in FIGS. 2 and 3, a control valve 33 is provided, substantially comprised of a piston 35 which is slidable within a cylinder 34 and subjected to the force exerted by a spring 36 against one end thereof.

In the normal braking mode, fluid is conveyed unrestrictedly from the master cylinder 37 through the lines 38, 39 into the annular chamber 40 and from there through the lines 41, 42 forth to the wheel cylinder 43. The annular chamber 40 is formed by two lands 44, 45.

Another land 46 is positioned at the left end of the piston 34. In the control mode, the electric motor shown in FIG. 4 will be put in motion by the electronic controller to drive the pump 48.

As already described above, the rotor of the motor, which is identified in FIG. 4 by the reference numeral 66, exerts a thrust force in the direction of the arrow 19 through the rotor shaft 20 and acts through the thrust member 49 on the force distributing member 50, which is illustrated also in FIGS. 2 and 3.

As a result, the thrust member 49 and member 50 slide the entire piston 34 to the right, to the switched position. The cross-sectional area of the part 51 connected to the line 39 will thus be closed by the land 45. Simultaneously, the port 53 connected to the line 52, which is closed in the normal braking mode by the land 46, will be opened. Fluid may now flow into the pressure chamber 54 which increases in volume with movement at the piston 34.

This fluid can be delivered into the pressure chamber 54 from the pump 48 and/or from the master cylinder 37.

According to the embodiment of FIG. 2, fluid is delivered into the pressure chamber 54 both from the pump 48 and from the master cylinder 37.

In the embodiment according to FIG. 3, the pressure chamber 54 is blocked with respect to the master cylinder 37 by the non-return valve 55. As will be appreciated, in the embodiment as per FIG. 3, the pressure chamber 54 can be filled with fluid under pressure only by the pump 48.

It should be noted that the pressure level of the pump 48 is higher than the pressure level of the master cylinder, so that in the event of operation of the pump 48, the non-return valve 56 according to FIG. 2 and the non-return valve 55 as per FIG. 3 will open.

In the anti-locking control mode, and this is true also in the embodiments according to FIGS. 2 and 3, fluid will flow out of the pump 48 through the restrictor 62, through the lines 57, 38, 58, through the flow limiting valve 59, through the restrictor 60 into the line 61 and from there to the wheel cylinder 43. A damping accumulator 63 is downstream of the pump 48. The flow of fluid into the wheel cylinder 43 is required for the pressure rebuilding-up phase during the control mode. The restrictor 60 and the flow limiting valve 59 serve to limit, the pressure build-up gradient. Instead of a restrictor, a rigid orifice may be applied as well. For the pressure reduction in the wheel cylinder 43, the electromagnetically actuatable outlet valve 64 is controlled by the controller (not shown). The outlet valve 64 which is closed when de-energized will be switched, that is to say, will be opened. Fluid can therefore flow back out of the wheel cylinder 43 into the reservoir 65.

In another embodiment, an orifice may be inserted upstream of the outlet valve in order to achieve a determined pressure reduction gradient. The motor 14 and, thus, the pump 48 will be switched off when changing from the control mode into the normal braking mode.

In the case of the embodiment according to FIG. 3, the piston 34 will then move into its left position of rest under the action of the compressed spring 36.

For restoring the piston 34, a pressure relief of the pump 48 will be required. In the embodiments according to FIGS. 2 and 3, the lines 68 and 69 are provided for this purpose. When the piston 34 moves from its blocking position, that is to say, from its right position, into its left position of rest, fluid will be delivered out of the chamber 54 through the line 68 into the annular chamber 70. Out of the annular chamber 70, fluid will be conveyed through the line 69 into the line 38. In the left position, that is to say, in the position of rest the piston 34, the line 69 is closed by the land 45.

We claim:

1. A brake pressure control system, in particular for automotive vehicles having wheel brakes, with at least one of an antilocking locking control system (ABS) and a traction slip control system (TSS), which operates with hydraulic fluid pressure, being comprised of a master cylinder, at least one wheel cylinder for each of said wheel brakes, a pressure modulator comprising a plurality of control valves actuatable for the modulation of the hydraulic pressure in said at least one wheel cylinder of the wheel brakes during a brake pressure control mode for each, at least one electric motor having a rotor, and a pump driven by said rotor of said motor for the generation of a fluid pressure,
at least a part of said rotor of said motor including an axially movable thrust member axially moved upon energization of said motor, said thrust member actuating at least one of said control valves of said pressure modulator by said movement thereof.

2. A brake pressure control system as claimed in claim 1, in which said control valves of said pressure modulator comprise inlet valves for the wheel cylinders actuatable to be either opened or closed, and wherein at least one of said inlet valves is actuated by said movement of said thrust member to be closed thereby.

3. A brake pressure control system as claimed in claim 2, wherein at least two of said inlet valves are included in said pressure modulator, a balance beam having either end engaging a respective one of both said inlet valves, said balance beam engaged by said thrust member to actuate both of said inlet valves.

4. A brake pressure control system as claimed in claim 1 further including a first unrestricted connection between, said master cylinder and said pump, and wherein said at least one of said control valves blocks said first unrestricted connection between said master cylinder and said wheel cylinder, and further including means operative upon blocking of said first unrestricted connection to cause the flow of hydraulic fluid to be conveyed over a second connection from said pump and from the said master cylinder through a restriction member to said wheel cylinder.

5. A brake pressure control system as claimed in claim 4 further including means causing said at least one of said control valves to be maintained in said blocking position by fluid pressure generated by said pump.

6. A brake pressure control system as claimed in claim 4 further including means causing said at least one of said control valves to be maintained in said blocking position by fluid pressure generated by said master cylinder.

7. A brake pressure control system as claimed in claim 4 further including means causing said at least one of said control valves to be maintained in said blocking position by fluid pressure generated by said pump and by said master cylinder.

8. A brake pressure control system as claimed in claim 4 wherein said restriction member comprises an orifice.

9. A brake pressure control system as claimed in claim 4 wherein said restriction member comprises a flow limiting valve.

10. A brake pressure control system as claimed in claim 9 wherein a restrictor is positioned between said flow limiting valve and wheel cylinder.

11. A brake pressure control system, in particular for automotive vehicle having wheel brakes, with at least one of antilocking control system (ABS) and a traction slip control system (TSS), which is operated with hydraulic fluid pressure, including a master cylinder, at least one wheel cylinder for each of said wheel brakes, a pressure modulator comprising a plurality of control valves for the modulation of hydraulic pressure in said wheel brakes during a brake pressure control mode, at least one electric motor, a pump driven by said motor for the generation of a hydraulic fluid pressure, wherein said motor includes a magnet assembly with an axially movable thrust member said thrust member actuating said at least one of said control valves upon energization of said motor.

12. A brake pressure control system as claimed in claim 11 wherein said motor includes a stator having windings and a rotor, said stator windings and rotor configurated to boost, an axial thrust of said rotor upon energizing said motor.

13. A brake pressure control system as claimed in claim 12 wherein the windings of said stator and said rotor are conically shaped.

* * * * *